United States Patent
Dixon et al.

(10) Patent No.: US 7,347,052 B2
(45) Date of Patent: Mar. 25, 2008

(54) METHODS AND SYSTEMS FOR PROCESSING UNCALCINED COKE

(75) Inventors: Todd W. Dixon, Lake Charles, LA (US); Dennis A. Smith, Market Rasen (GB); Carl L. Williams, Cypress, TX (US); Eric Booth, Houston, TX (US)

(73) Assignee: Conocophillips Company, Houston, TX (US)

( * ) Notice: Subject to any disclaimer, the term of this patent is extended or adjusted under 35 U.S.C. 154(b) by 817 days.

(21) Appl. No.: 10/755,629

(22) Filed: Jan. 12, 2004

(65) Prior Publication Data

US 2005/0150205 A1 Jul. 14, 2005

(51) Int. Cl.
*F02C 7/00* (2006.01)

(52) U.S. Cl. ............... 60/783; 60/39.182; 201/17; 202/131

(58) Field of Classification Search ............ 60/39.182, 60/39.464, 772, 781, 783; 201/16, 17; 202/131, 202/136
See application file for complete search history.

(56) References Cited

U.S. PATENT DOCUMENTS

| | | | |
|---|---|---|---|
| 1,665,344 A | 4/1928 | Caracristi | |
| 2,734,853 A * | 2/1956 | Smith et al. | 208/127 |
| 2,964,464 A | 12/1960 | Smith et al. | |
| 3,116,231 A | 12/1963 | Adee | |
| 4,022,569 A | 5/1977 | Farago et al. | |
| 4,053,365 A | 10/1977 | Welter | |
| 4,083,752 A | 4/1978 | Bielski et al. | |
| 4,158,541 A | 6/1979 | Klechka et al. | |
| 4,176,010 A | 11/1979 | Dudek et al. | |
| 4,198,273 A | 4/1980 | Dudek et al. | |
| 4,251,323 A | 2/1981 | Smith | |
| 4,402,273 A | 9/1983 | Nagl et al. | |
| 4,439,275 A * | 3/1984 | Noguchi | 202/100 |
| 4,602,575 A | 7/1986 | Grethe | |
| 4,718,984 A | 1/1988 | McConaghy, Jr. et al. | |
| 4,720,338 A | 1/1988 | Newman et al. | |
| 4,822,379 A | 4/1989 | Thompson | |

(Continued)

FOREIGN PATENT DOCUMENTS

EP 0 955 455 A1 11/1999

(Continued)

OTHER PUBLICATIONS

Harald Onder and Edward A. Bagdoyan, Everything You Always Wanted to Know About Petroleum Coke, *Svedala Industries Handbook*, 1993, 4th Printing—Sep. 1997, pp. 1-54, Precision Printers, Inc.

(Continued)

*Primary Examiner*—L. J. Casaregola
(74) *Attorney, Agent, or Firm*—Baker & McKenzie LLP (57) ABSTRACT

Methods and systems for processing uncalcined coke are provided. The methods and systems provide for combusting effluent gas from a refinery unit and a stream of uncalcined coke. The refinery unit effluent gas may be the offgas from a rotary kiln calciner. The refinery unit effluent gas and the uncalcined coke stream are combusted in an integrated gas/solids incinerator. Heat released during the combustion of these streams may be used to generate steam or electricity. The methods and systems disclosed provide low cost energy production at calciner effluent gas incinerator locations where uncalcined coke is available.

19 Claims, 5 Drawing Sheets

U.S. PATENT DOCUMENTS

| | | |
|---|---|---|
| 5,022,329 A | 6/1991 | Rackley et al. |
| 5,052,312 A | 10/1991 | Rackley et al. |
| 5,066,325 A | 11/1991 | Lehto |
| 5,123,361 A | 6/1992 | Nieh et al. |
| 5,251,433 A | 10/1993 | Wallace |
| 5,292,247 A | 3/1994 | Bauer |
| 5,487,873 A | 1/1996 | Bridges et al. |
| 5,711,018 A | 1/1998 | Hittner et al. |
| 6,168,709 B1 | 1/2001 | Etter |
| 6,261,090 B1 | 7/2001 | Boswell et al. |
| 6,363,868 B1 | 4/2002 | Boswell et al. |
| 6,390,810 B1 | 5/2002 | Rinker et al. |
| 6,570,049 B2 | 5/2003 | Taylor |
| 6,619,041 B2 | 9/2003 | Marin et al. |
| 2002/0010382 A1 | 1/2002 | Taylor |
| 2002/0092449 A1 | 7/2002 | Gutmark |
| 2002/0179493 A1 | 12/2002 | Etter |

FOREIGN PATENT DOCUMENTS

| | | |
|---|---|---|
| EP | 1 065 189 A1 | 1/2001 |
| WO | WO 96/35092 | 11/1996 |
| WO | WO 00/10914 | 3/2000 |

OTHER PUBLICATIONS

James G. Speight and Bakl Özüm, Petroleum Refining Processes, 2002, pp. 368-385, Marcel Dekker, Inc., USA.

www.metsominerals.com, Coke Calcining Systems, 2002, pp. 1-8, Sweden.

Hickey D R: "Operation of co-fluid coke boiler", American petroleum Institute—Proceedings of the Annual Meeting of the American Petroleum Institute (API), New York, NY, United States, vol. 45, No. Sec 3, 1965, pp. 101-105, XP008043946, Figure 1.

Studley Bruce C et al: "Initial operating experiences and overall enhancements at the Chilean coke fired petropower cogeneration facility" Proceedings of the 2002 International Joint power Generation Conference 2002, 2002, XP008044091, pp. 403-411.

Bauer A M et al: "Cogenerate with coke" American Institute of Chemical Engineers. Annual Meeting, Apr. 4, 1986 91986-04-06), XP008042173, pp. 1-31.

* cited by examiner

FIG. 1 (COMPARATIVE)

METHODS AND SYSTEMS FOR PROCESSING UNCALCINED COKE

FIELD OF THE DISCLOSURE

This disclosure relates to methods and systems for processing uncalcined coke, including the production of energy from the combustion of uncalcined coke.

BACKGROUND INFORMATION

In most oil refining processes, uncalcined coke is produced from petroleum residual fractions. Many processes are known for producing uncalcined coke. Of the coking processes in commercial use, such as delayed coking, fluid coking and flexi-coking, delayed coking has emerged as the technology of choice due to its lower investment cost and its ability to provide comparable yields of products, but of higher quality.

A typical delayed coking process is a semi-continuous process in which heavy hydrocarbon feedstock is heated to cracking temperature using a heat source such as a coker furnace. The heated feedstock is then fed continuously to a coking drum, where it reacts in its contained heat to convert the feedstock to coke and cracked vapors. The cracked vapors, which are normally the primary objective of the coking process, are passed overhead to a coker fractionator, condensed and recovered as lower boiling hydrocarbon products. When the coke drum contents reach a predetermined level, the feedstock supply is switched to another drum, and the full drum is cooled and de-coked. The material removed from the drum is commonly referred to as "uncalcined" or "green" petroleum coke, or "uncalcined coke".

This general delayed coking process is well known and many variations of the process exist. An exemplary version of the process is disclosed in U.S. Pat. No. 4,720,338.

The uncalcined coke recovered from the various coking processes may be subjected to a variety of additional process steps.

For example, uncalcined coke contains volatile combustible material (VCM) and water. Green coke that is considered suitable for use in the aluminum or steel industries or in the production of titanium oxide is typically calcined to remove VCM and associated moisture and to otherwise improve critical physical properties such as density and crystalline structure.

Rotary kilns are frequently used for calcining coke. When a rotary kiln is used, particulate green coke is fed into one end of an inclined rotating and generally cylindrical kiln having burners near the discharge end of the kiln to provide heat for transforming the uncalcined coke into calcined coke as the coke moves through the calciner. Other systems suitable for calcining coke include rotary hearth furnaces and shaft kilns.

Descriptions of coke calcining processes and rotary kiln designs can be found in U.S. Pat. Nos. 4,022,569 and 4,053,365. The exhaust from rotary kiln calciners, and other types of calciners, contains entrained coke particles and the volatile components driven from the uncalcined coke. This exhaust is known as calciner effluent gas or "offgas."

Environmental regulations throughout the world require that the entrained coke particles and volatile components in the calciner effluent gas be captured and disposed of to prevent releasing these materials into the environment. The calciner effluent gas is often disposed of by mixing the effluent gas with air and burning the mixture in an incinerator. The energy released during burning the offgas may be captured by heating water to produce steam for use in heat transfer processes or for electric power generation.

It is also known that coke may be burned for its high heat value as disclosed in U.S. Pat. No. 4,602,575. U.S. Pat. No. 6,570,049 discloses an incineration system for burning a variety of materials, including petroleum coke.

BRIEF DESCRIPTION OF THE DISCLOSURE

This disclosure relates to methods and systems for processing uncalcined coke materials. The methods and systems involve combusting refinery offgas streams, including effluent gas from a coke calciner, and uncalcined coke in an integrated gas/solids incinerator. For simplicity, the integrated gas/solids incinerator is hereinafter referred to as an "incinerator," but it is to be understand that the reference is to an integrated gas/solids incinerator. The offgas stream may be the offgas from a rotary kiln calciner. The heat released during combustion may be used to generate steam or electricity. The offgas and the uncalcined coke streams may be introduced into the incinerator and combusted simultaneously or may be introduced and combusted in the incinerator independently form each other. The methods and systems provide low cost energy production at calciner effluent gas incinerator locations where uncalcined coke is available.

DETAILED DESCRIPTION

Figure 1:
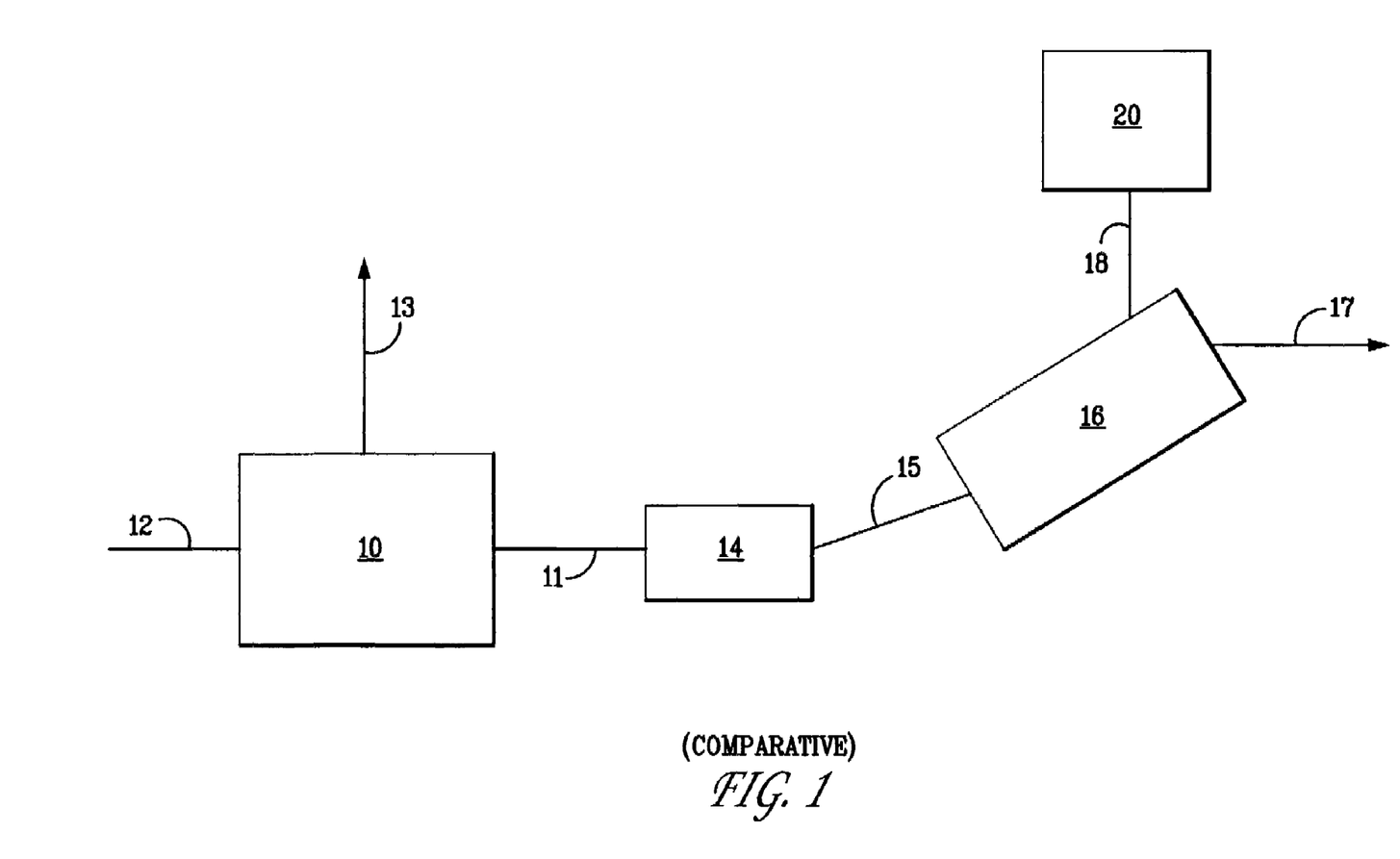
FIG. 1 is a schematic diagram of a conventional integrated petroleum coking, calcining, and calciner effluent incineration process.

To maximize the value of feedstocks, most modern oil refineries incorporate a coker, a calciner, and an incinerator to obtain the highest economic yield from petroleum residual fractions. A typical process scheme incorporating these components is depicted schematically in FIG. 1. With reference to FIG. 1, coker 10 receives petroleum residual fraction stream 12, which through the heating process described in the BACKGROUND INFORMATION, converts the petroleum residual to uncalcined coke by boiling away the volatile commercially valuable products 13. The remaining uncalcined coke product is removed from the coker as stream 11 and pulverized in grinder 14. The pulverized uncalcined coke 15 is fed to a calciner 16, often a rotary kiln calciner, maintained at a temperature form about 1200° C. to about 1650° C. to remove water and residual volatile components from the uncalcined coke.

Calcined coke 17 is removed from the calciner. An effluent gas 18, which in the case of a rotary kiln calciner is referred to as rotary kiln offgas, is exhausted from the calciner. The calciner effluent gas from the calciner typically contains a variety of volatile components along with entrained coke particles. The effluent gas is often processed by burning in incinerator 20. To improve efficiencies, in some refining operations, the heat released during burning of the calciner effluent gas is used for steam and/or electrical power generation.

The methods and systems described in this disclosure improve the efficiencies of processing coke materials in refinery process schemes. In particular, the methods and systems described herein incorporate means for burning at least one stream of uncalcined coke in an incinerator and at least one stream of refinery offgas in the same incinerator. For purposes of this disclosure, the term "refinery offgas" refers to various effluent gas streams containing gaseous combustible hydrocarbonaeous material and optionally entrained finely divided solid or liquid hydrocarbonaceous materials, or any combination of the various materials and generated by processing units in a petroleum refinery or a facility other than a refinery that processes petroleum product streams. The phrase "other than a refinery" means the particular units generating the offgas stream are not necessarily integrated into a petroleum refinery although they are the type of units that are typically located in a refinery. Exemplary petroleum refinery units are delayed and fluidized coking units, calcining units, fluid catalytic cracker (FCC) units, catalytic reforming units, and hydrotreating units.

The methods and systems of the present invention are found particularly efficient and useful at refinery locations where there is an abundant supply of uncalcined coke. The uncalcined coke and refinery offgas streams may be introduced and burned in the incinerator simultaneously. Alternatively, the uncalcined coke or the refinery offgas stream may be introduced and burned in the incinerator independent of each other.

The processes and systems described herein are useful in any process scheme incorporating a coker and a refinery unit that produces a refinery offgas stream. Moreover, the processes and systems are useful regardless of the types of feedstocks run in the units and the quality of the coke produced from the feedstocks.

Figure 2:
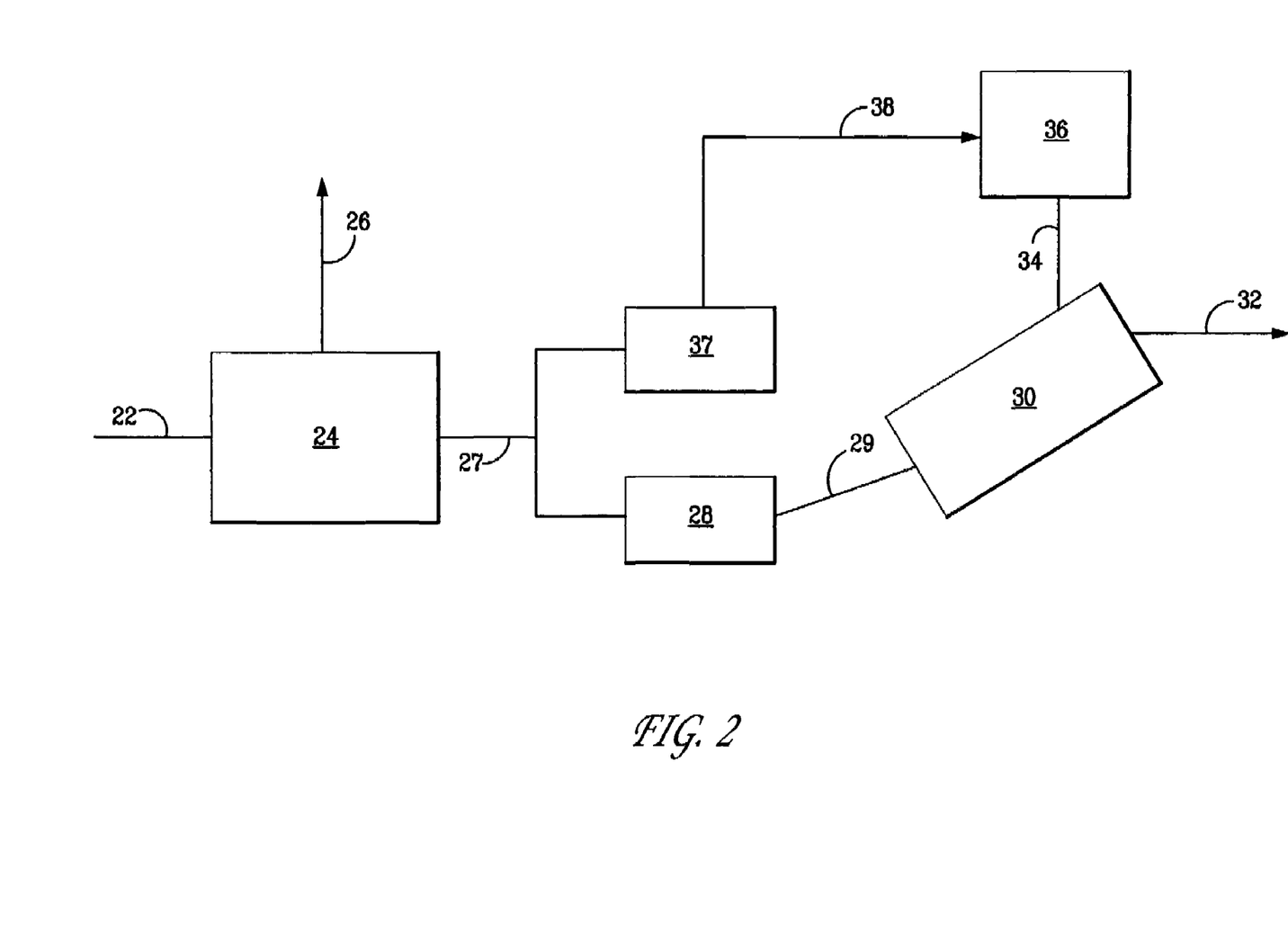
FIG. 2 is a schematic diagram of an embodiment of the methods and systems described herein.

FIG. 2 is schematic representation of an embodiment of the methods and systems described herein in which the unit that produces a refinery offgas stream is as a rotary kiln calciner. With reference to FIG. 2, a petroleum residual fraction stream 22 is fed to coker 24 in which the petroleum residual fraction is heated at a temperature from about 480° C. to about 600° C. Volatile components 26 are removed from the coker 24 during the coking process thereby forming an uncalcined coke product. The uncalcined coke 27 is removed from the coker by any method and at least a portion of the uncalcined coke is pulverized in grinder or other pulverizing means 28 to form uncalcined coke particles suitable for feed to a calciner in accordance with any suitable processes for preparing uncalcined coke for introduction into a calciner.

The uncalcined coke particles 29 are fed to a calciner 30. The calciner may be of any design. In one embodiment, the calciner is a rotary kiln calciner operated at a temperature from about 1200° C. to about 1650° C.

Calcined coke 32 is removed from the calciner 30 and an effluent gas stream 34 is withdrawn from calciner 30. In the case of a rotary kiln calciner, the effluent gas 34 is referred to as rotary kiln offgas. The effluent gas 34 contains a variety of volatile components along with entrained particles of coke of a variety of sizes that are dependent on the particular coking process used to provide the uncalcined coke feed, the method of preparing the uncalcined coke for introduction into the calciner, the type of calciner used, and the conditions in the calciner.

At least a portion of effluent gas 34 may be processed by combustion in incinerator 36. Additionally, at least a portion of the uncalcined coke 27 produced in coker 24 may be combusted in incinerator 36 in accordance with the methods and systems disclosed herein.

The heat generated from combustion of at least a portion of effluent gas stream 34 and at least a portion of uncalcined coke stream 27 may be used for steam production and/or electrical power generation in accordance with conventional methods.

The calciner effluent stream may be introduced in incinerator 36 through any conventional inlet means for introducing a calciner effluent stream into an incinerator. Due to the high temperature of a typical refinery offgas stream, particularly the offgas from a calciner, the offgas stream will usually ignite upon mixing with air in the inlet of the incinerator without a supplemental ignition source. It is generally found that once ignited, the heat produced from combustion of the calciner effluent stream results in a self-sustaining combustion reaction of the calciner effluent gas.

In one embodiment, to achieve more complete combustion, the calciner effluent gas stream 34 is mixed with oxygen, typically in the form of air or oxygen enriched air, prior to introduction of the calciner effluent gas stream into the combustion chamber of incinerator 36. However, it is understood that the calciner effluent gas stream may be oxygenated within the combustion chamber of incinerator 36. As used herein, "mixed with oxygen" shall include mixing with air or oxygen enriched air, which may be provided at atmospheric or higher pressures, i.e., which may be compressed. A "source of oxygen" shall include a source of air or oxygen enriched air, which may be provided at atmospheric or higher pressures.

In one embodiment, to prepare the uncalcined coke for burning in incinerator 36, the uncalcined coke is processed in grinder or mill 37 to produce uncalcined coke particles 38 having a particle size distribution in which at least 50% of the particles will pass through a 200 mesh screen. In another embodiment, at least 70% of the uncalcined coke particles will pass through a 200 mesh screen. In a third embodiment, at least 80% of the uncalcined coke particles will pass through a 200 mesh screen. However, it is understood that the uncalcined coke particles may be of size that permits the coke particles to be introduced into the incinerator and combusted therein.

In one embodiment, the uncalcined coke particles are introduced into the combustion chamber of incinerator 36 without mixing with oxygen in the form of air or oxygen enriched air. However, to maximize combustion efficiency of the uncalcined coke, air or oxygen enriched air may be introduced directly into the combustion chamber of incinerator. It is also understood that the uncalcined coke may be mixed with air or enriched air prior to introduction into the incinerator. In one embodiment, the uncalcined coke particles are introduced into incinerator 36 through one or more solids burners. The uncalcined coke may be introduced in the pulverized solid form as prepared in grinder 37. Alternatively, the pulverized uncalcined coke from grinder 37 may be mixed with a combustible gas to aid in the combustion of the pulverized uncalcined coke. Mixing with the combustible gas may occur prior to or in conjunction with introducing the uncalcined coke through the solid burners.

Any combustible gas is suitable with exemplary combustible gases being natural gas and the component gases of natural gases such as methane, ethane, and propane. In another embodiment, the uncalcined coke is mixed with a carrier gas prior to or in conjunction with introducing the uncalcined coke through the solid burners. The carrier gas functions a mechanical aid in dispersion of the uncalcined coke particles to assist in combustion of the uncalcined coke. The carrier gas may also provide an oxygen source and therefore function as a chemical aid to more complete combustion of the uncalcined coke. An exemplary carrier gas is air. There are other suitable carrier gases. For example, nitrogen may be used as a carrier gas although economics generally make the use of such carrier gases less attractive than the use of air.

In accordance with the methods and systems described herein, the calciner effluent may be introduced and combusted in the incinerator 36, simultaneously. Alternatively, in another embodiment, the uncalcined coke particles 38 are introduced and combusted within incinerator 36 independent from the introduction and combustion of effluent gas 34 to produce heat for steam and/or electricity production. It may be desirable to burn the uncalcined coke particles independent of burning effluent gas 34 in circumstances in which market conditions do not warrant production of calcined coke products or when other refinery offgas streams are unavailable. Also, it may be advantageous to burn the uncalcined coke particles 38 independent of burning effluent gas 34 in circumstances in which the petroleum residue feedstock available produces uncalcined coke having physical properties that may not be economically enhanced through calcining under existing market conditions. Moreover, if a calcining unit is not operational, it may be economically desirable to burn the uncalcined coke particles 38 independent of burning effluent gas 34 rather than to store uncalcined coke until the calciner is operational, sell it as uncalcined coke, or dispose of it as solid waste.

When the calciner effluent stream and the uncalcined coke stream are introduced and combusted in the incinerator 36 simultaneously, the streams may be introduced into the incinerator over a wide range of relative proportions such as may be dictated by the available stream volumes and material handling systems capacities. The relative proportions may be characterized as the relative energy values of the streams introduced into the combustion chamber over a given unit of time. In one embodiment, about 20% to about 80% of the total energy value input of the uncalcined coke stream 38 and the calciner effluent stream 34 is derived from the uncalcined coke stream and from about 80% to about 20% is derived from the derived from the calciner effluent stream. In another embodiment, about 60% to about 80% of the total energy value input over a given unit of time is derived from the uncalcined coke stream and from about 40% to about 20% is derived from the calciner effluent gas stream introduced into incinerator 36. Generally, for equal volume of the two streams, the energy released upon combustion is in a ratio of about 3:2 in favor of the calciner effluent stream.

Separate means for introducing the calciner effluent gas and the uncalcined coke into the incinerator are necessary because of the relative reactivities of the uncalcined coke particles and the calciner effluent gas.

Figure 3:
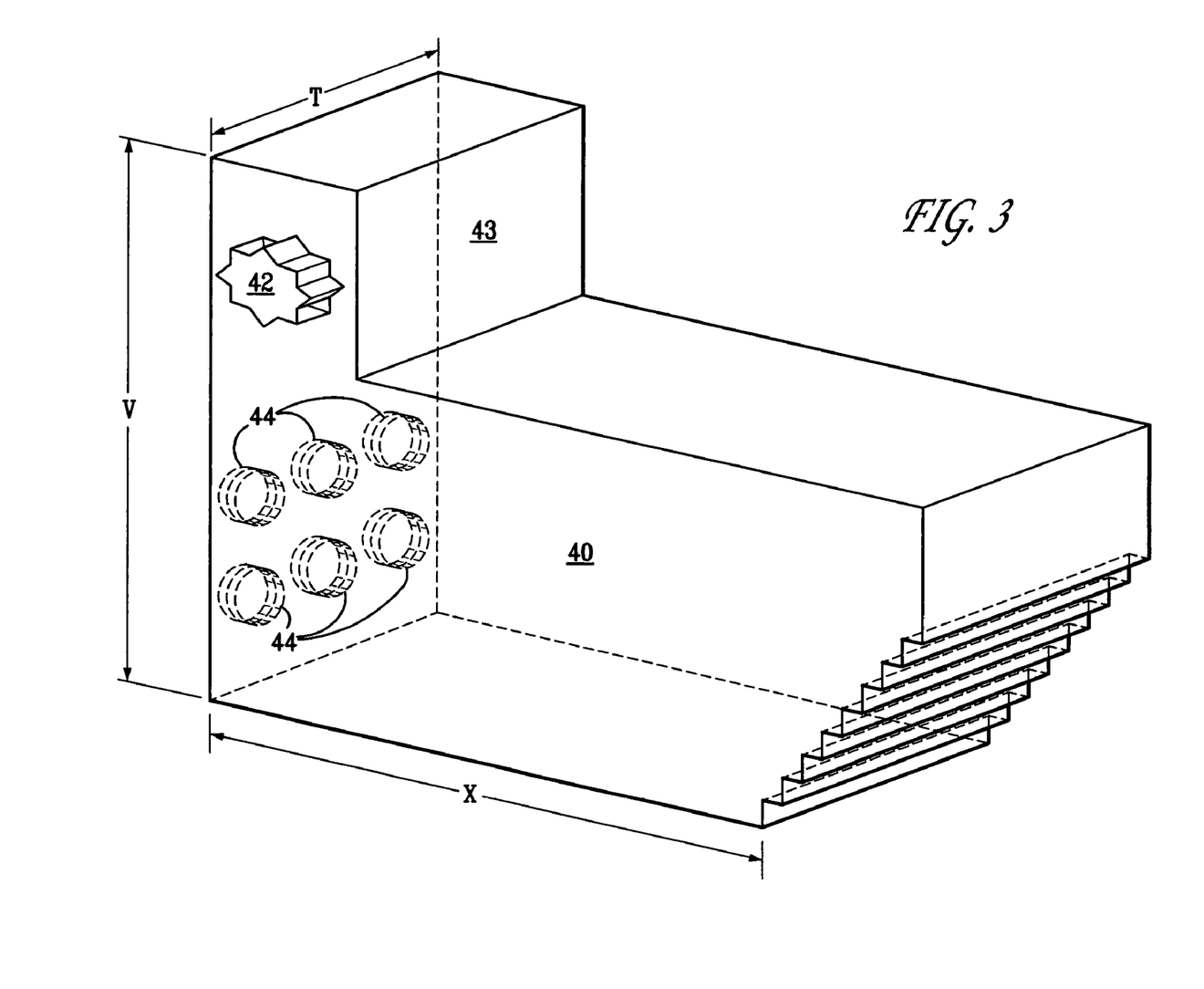
FIG. 3 is view of an embodiment of an incinerator configuration in accordance with the methods and systems described herein.

FIG. 3 provides a depiction of one embodiment of the methods and systems for processing uncalcined coke described herein. In particular, FIG. 3 depicts methods and systems for introducing a refinery offgas, which is described herein as a calciner effluent gas, and uncalcined coke particles into an incinerator suitable for burning both materials simultaneously or independent of each other, as discussed in connection with the embodiment depicted in FIG. 2.

FIG. 3 depicts an incinerator with a combustion chamber 40 having a longitudinal dimension indicated by "X", a transverse dimension indicated by "T", and a vertical dimension indicated by "V". The incinerator is a refractory walled incinerator having a calciner effluent gas inlet 42, within an inlet chamber 43, oriented generally perpendicular to the longitudinal dimension of the combustion chamber. Inlet 42 may be a conventional design used for introducing calciner effluent gas into an incinerator. Although one calciner effluent gas inlet is depicted, more than one inlet may be incorporated in accordance with the methods and systems described herein. The calciner effluent gas should be introduced into the incinerator at a rate corresponding to a pressure drop gradient from the calciner to the incinerator. In one embodiment, the pressure drop ranges from about 12 Pa to about 37 Pa. In another embodiment, the pressure drop is from about 12 Pa to about 25 Pa.

The calciner effluent gas stream may be introduced into the incinerator at any angle relative to the longitudinal dimension of the combustion chamber. However, to provide for more efficient combustion of the calciner effluent stream, the stream may be introduced into the incinerator in a flow direction that is generally perpendicular to the longitudinal dimension of the incinerator. It has been determined that a perpendicular direction generates a swirling pattern, or eddy currents, in the calciner effluent gas stream resulting from contact with the walls of the inlet chamber and combustion chamber. This swirling motion leads to more complete combustion of the calciner effluent gas.

The calciner effluent gas stream is mixed with oxygen, that may be provided in the form of air or oxygen enriched air, to bring about combustion within the incinerator. In one embodiment, the air is mixed with the effluent gas by the injection of compressed air through an air injection manifold within inlet 42. In one embodiment, the air injection is provided by the inclusion of an annular-shaped manifold ring disposed around the circumference of the inlet 42. The annular ring has a series of air inlets passages that permit the introduction of air or oxygen enriched air into the calciner effluent gas stream around the circumference of inlet 42. It is understood that under typical circumstances because of the high temperature of the calciner effluent stream, the stream will ignite upon contact with oxygen. Therefore, combustion typically takes place within the inlet chamber 43 as well as the combustion chamber 40.

Generally, for efficient combustion of the calciner effluent gas stream, air or enriched air should be mixed with the calciner effluent stream in a stoichiometric amount. However, in other embodiments, it may be advantageous to introduce concentrations of air that are more than or less than stoichiometric.

Uncalcined coke may be introduced into the combustion chamber 40 through burners 44. The burners provide a means for introducing the uncalcined coke into the combustion chamber. Generally, the uncalcined coke will ignite upon introduction in the combustion chamber in the presence of an ongoing combustion reaction in the incinerator. However, under typical conditions, if there is no ongoing combustion reaction in the combustion chamber 40, such as upon start-up of the incinerator, it will be necessary to provide a supplemental ignition source, such as a pilot flame, within or near the solid burners to initiate combustion of the uncalcined coke. Once combustion of the uncalcined coke is initiated, the supplemental ignition source is typically no longer necessary since combustion of the uncalcined coke is usually a self-sustaining reaction.

In the embodiment depicted in FIG. 3, six burners are provided for introducing the uncalcined coke into the combustion chamber. In other embodiments, 1 to 10 burners are provided as ignition sources for combustion of the uncalcined coke. However, in theory, the number of burners is limited only by the dimensions of the combustion chamber of the incinerator and the amount of uncalcined coke to be burned in the combustion chamber. A variety of burner designs are suitable for use in the methods and systems described herein. Exemplary commercially available burners are solid fuel burners available from Foster Wheeler, Humboldt, and Mitsui-Babcock. In one embodiment, the burners are capable of firing uncalcined coke in the range of about 160 MMBtu/hr to about 250 MMBtu/hr.

As described in connection with the embodiment depicted in FIG. 2, the uncalcined coke and calciner effluent gas stream may be introduced and combusted in the incinerator simultaneously. Alternatively, the uncalcined coke or the calciner effluent gas stream may be introduced and burned in the incinerator independent of each other. In the embodiment depicted in FIG. 3, the same ranges of proportions of the energy input values of the uncalcined coke stream and the calciner effluent stream, as described in connection with the embodiment depicted in FIG. 2, may be utilized.

Figure 4:
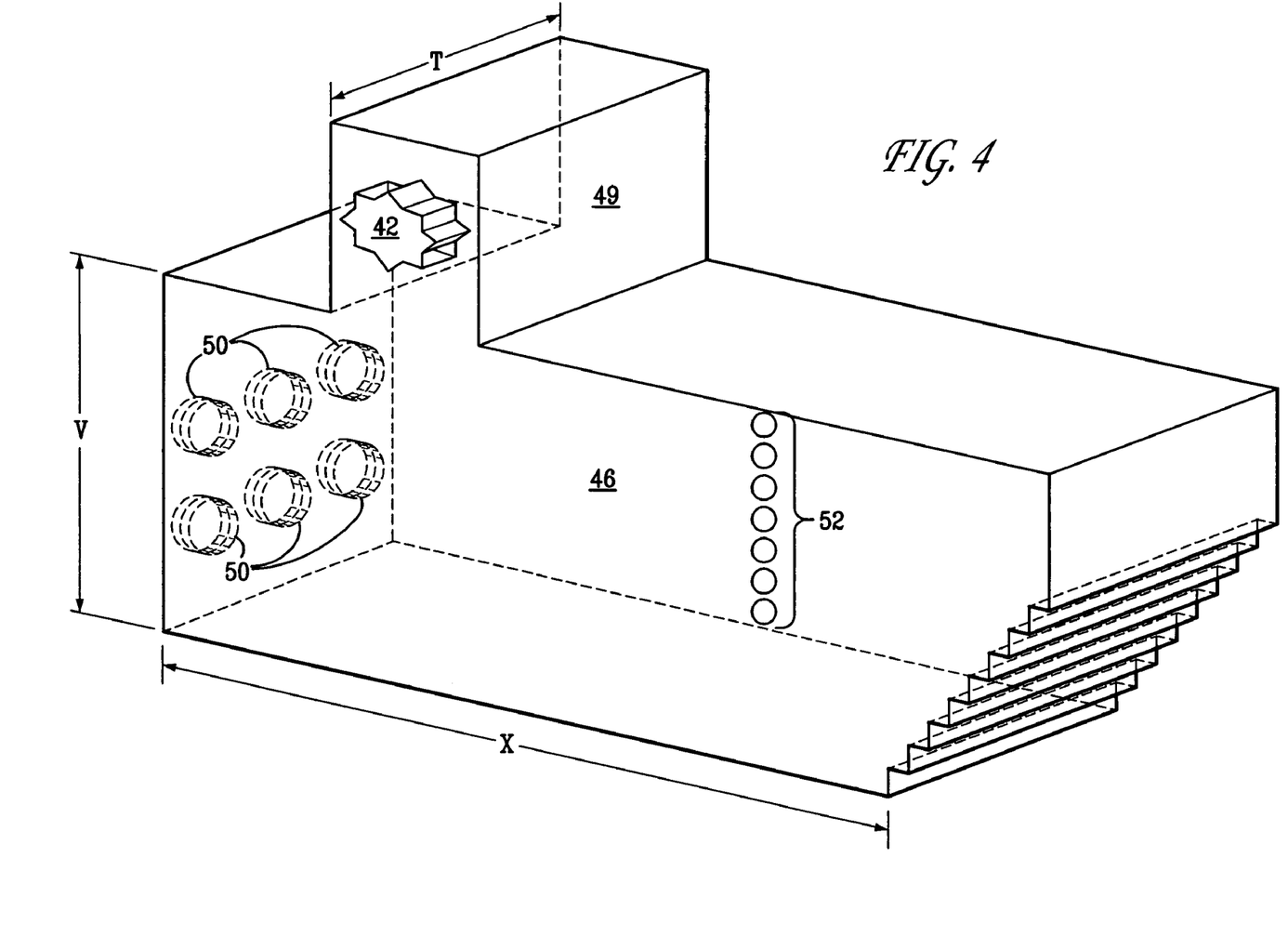
FIG. 4 is view of an embodiment of an incinerator configuration in accordance with the methods and systems described herein.

FIG. 4 depicts another exemplary embodiment of the methods and systems described herein. This embodiment, similar to the embodiment depicted in FIG. 3, is an incinerator with a combustion chamber 46, having a longitudinal dimension indicated by "X", a transverse dimension indicated by "T", and a vertical dimension indicated by "V". The incinerator is a refractory walled incinerator having a refinery offgas, such as a calciner effluent gas, inlet 48, within an inlet chamber 49, with a flow direction oriented generally perpendicular to the longitudinal dimension and flow path of the combustion chamber.

Although one calciner effluent gas stream inlet is depicted, more than one calciner effluent gas inlet may be incorporated in the design depicted. In this embodiment of FIG. 4, multiple burners 50 are provided for introducing uncalcined coke into the combustion chamber 46. One of the differences between the embodiment of FIG. 4 and the embodiment depicted in FIG. 3 is the spatial relationship between the calciner effluent gas inlet 48 within inlet chamber 49 and the uncalcined coke introduction burners 50. As is seen in FIG. 4, in comparison to the embodiment of FIG. 3, the location of the calciner effluent gas inlet is positioned along the longitudinal axis of the combustion chamber at a position away from the burners 50. It has been determined that positioning the calciner effluent gas inlet away from the uncalcined coke burners improves combustion efficiency of the uncalcined coke. Introducing the calciner effluent gas near the uncalcined coke burners is thought to prevent flame attachment from the burners to the uncalcined coke. In other words, if the calciner effluent stream is introduced immediately adjacent to the burners, the uncalcined coke may not ignite at the burners but at a location away from the burners, leading to less efficient combustion of the uncalcined coke particles.

Another feature depicted in FIG. 4 is the use of air inlets 52. These inlets allow for introduction of oxygen, typically in the form of compressed air or oxygen enriched air, into the combustion chamber of incinerator 46. Any number of air inlets may be useful for this purpose. In one embodiment, the number of inlets ranges form 3 to 10 inlets. Additionally, a variety of configurations of the air inlets may be provided in accordance with the methods described herein. For example, although a single row of air inlets is depicted in FIG. 4, multiple rows of air inlets, and other configurations, may be provided. In one embodiment, a single row of air inlets that are spaced to equally divide the vertical dimension of the combustion chamber is provided. In one embodiment, the air inlets are sized to allow flowing air to penetrate into the combustion chamber a distance of 50% of the transverse dimension represent by the letter "T".

In one embodiment, the air flow through the inlets is at a velocity ranging from about 30 meters per second to about 45 meters per second.

In the embodiment depicted in FIG. 4, the same ranges of proportions of the energy input values of the uncalcined coke stream and the calciner effluent stream, as described in connection with the embodiment depicted in FIG. 2, may be utilized. As described in connection with the embodiment depicted in FIG. 2, the uncalcined coke and refinery offgas stream may be introduced and combusted in the incinerator simultaneously. Alternatively, the uncalcined coke or the calciner effluent gas stream may be introduced and burned in the incinerator independent of each other.

To provide consistency and to facilitate explanation of the system designs in accordance with this disclosure, dimensions within certain exemplary embodiments of the methods and systems described herein are expressed as percentages of the longitudinal dimension of the combustion chambers 40 and 46 of FIGS. 3 and 4, respectively. For purposes of this disclosure, this dimension shall be referred to as "x". It is understood that the spatial relations described below are for exemplary embodiments and other spatial relationships are contemplated by this disclosure.

With reference to FIG. 3, the burners are located in the end wall of incinerator 40 and directly below the effluent gas inlet 42. The top row of burners may be located at any position along the vertical dimension of the combustion chamber. In exemplary embodiments, the top row of burners is located at a distance below the offgas inlet chamber 43 ranging from about 0.27x to about 0.30x. The vertical spacing between the top row of burners and the bottom row of burners ranges from about 0.13x to about 0.19x. The bottom row of burners is positioned from about 0.21x to about 0.25x vertically above the bottom of the combustion chamber. The overall vertical dimension of the combustion chamber ranges from about 0.67x to about x.

In the transverse dimension, in exemplary embodiments, the ends of each row of burners may be located from about 0.21x to about 0.25x from the edges of the end wall of the incinerator. The burners are spaced from about 0.13x to about 0.19x from each other in the transverse dimension. The overall transverse dimension of the combustion chamber and the inlet chamber ranges from about 0.57x to about 0.77x.

In the vertical dimension, the height of the offgas inlet chamber ranges form abut 0.38x to about 0.40x The width of the offgas inlet chamber in the longitudinal dimension is from about 0.38x to about 0.40x.

With reference to FIG. 4 and embodiments described above, the refinery offgas inlet 48 may be positioned in the longitudinal dimension a distance away form burners 50. In exemplary embodiments, this distance may be from 0.2x to 0.3x.

The geometric shape of the combustion chambers depicted in FIGS. 3 and 4, with walls disposed at right angles is thought to provide more complete combustion by promoting the creation of eddy currents as mentioned previously. However, it is understood that the combustion chamber may be any geometric shape, including a cylindrical shape.

Although the air inlets 52 promote the sustained combustion of the calciner effluent gas components, the inlets are found to be particularly useful to sustain combustion of the uncalcined coke introduced through burners 50. Combustion in the combustion zone may be maintained over a range of oxygen concentrations.

Oxygen concentrations within the combustion chamber sufficient to provide efficient combustion of the calciner effluent gas stream and the uncalcined coke particles may be determined by monitoring the temperature of the outlet stream exiting the incinerator. Specifically, the oxygen concentration should be maintained at a level sufficient to produce combustion, generating an incinerator outlet gas with at a temperature of about 1090° C. to about 1375° C. In another embodiment, the oxygen concentration in the combustion chamber is maintained at a level sufficient to provide an outlet stream with at a temperature of about 1125° C. to about 1300° C. In still another embodiment, the oxygen concentration in the combustion chamber is maintained at a level sufficient to provide an outlet stream with at a temperature of about 1150° C. to about 1250° C. The oxygen concentration in the combustion chamber is typically maintained from about 3% to about 7%. Less oxygen may be used but may not be sufficient to produce combustion generating desired incinerator outlet gas temperatures. More oxygen may be used, but may not be economical and/or may not produce combustion generating desired incinerator outlet gas temperatures. This concept may be incorporated into any embodiment of the methods and systems with more than one burner.

Figure 5:
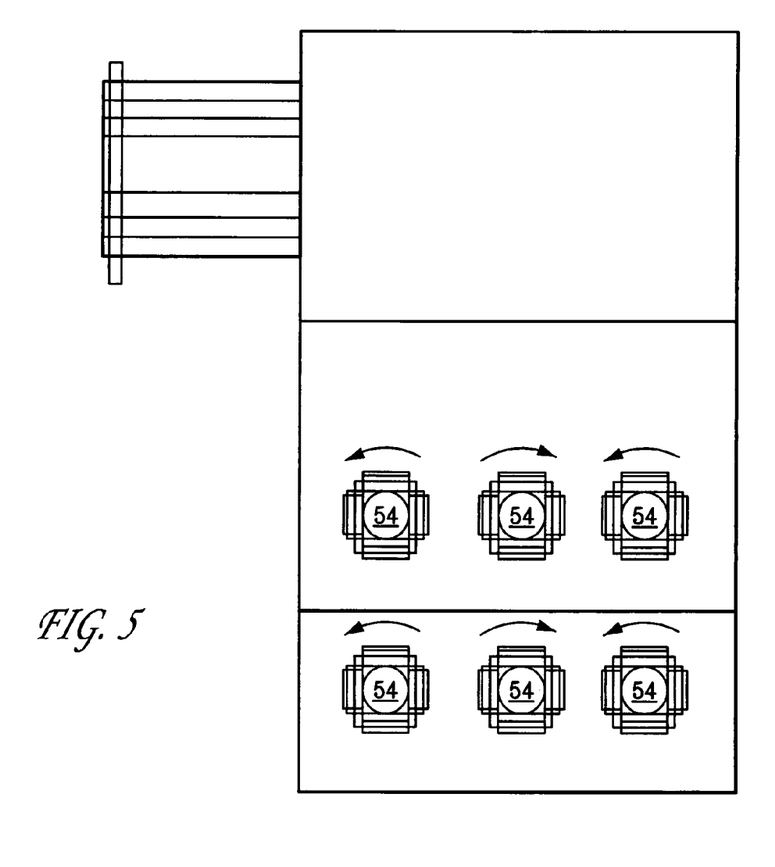
FIG. 5 is a depiction of swirl directions of incinerator burners for combustion of uncalcined coke in accordance with an embodiment of the methods and systems described herein.

It has also been determined that certain swirl patterns associated with the uncalcined coke burners, provided in accordance with the methods and systems described herein, will optimize combustion of the uncalcined coke. Specifically, by alternating the swirl directions of adjacent burners, combustion of the uncalcined coke will be more complete. This concept is represented in FIG. 5 wherein the swirl directions for six burners 54 are represented by arrows. As seen, the swirl direction for each burner in a row of burners alternates.

The process and systems generally described herein, and in the specific embodiments depicted are capable of burning refinery unit offgas streams and uncalcined coke streams at an efficiency producing a burnout rate of 98% of the coke in these streams. In other words, the processes and systems are capable of burning these streams to a level at which only 2% solids remain. Of course, it is understood that the processes and systems disclosed herein may be practiced to achieve other burnout rates.

The systems described herein may be used in conjunction with conventional sulfur and $NO_x$ removal and disposal systems for exhaust gases. With respect to vanadium production, it is found that the use of conventional injection techniques to control temperatures within the combustion chambers described are useful in suppression of vanadium production.

Of course, the combustion chambers of the systems described herein produce a hot exhaust stream as well as radiant heat. Both forms of heat may be used to produce steam and electricity. The radiant heat may be conducted to boiler water to assist in the production of steam by through the use of systems such as radiant heat zones adjacent to the combustion chamber in accordance with conventional methods.

An effective method of utilizing the combustion chamber exhaust gas to generate electricity and back pressure steam is a combined gas turbine/steam turbine cycle, which operates as follows. In such a system, the exhaust gas is passed through a gas turbine connected to a electric generator. The exhaust gas, after passing the turbine, is still at high temperature, and is then routed past a heat boiler which generates high pressure superheated steam. The steam is used to drive a back pressure steam turbine connected on the same shaft as the above mentioned gas turbine, thereby increasing the electricity production. Alternatively, the steam may be used in other heat transfer system for other uses.

It is understood there are numerous and varied known methods for producing steam and electricity using hot exhaust gases that may be used in conjunction with the methods and systems described herein. Exemplary systems for use of hot exhaust gases for steam and electricity production are disclosed in U.S. Pat. Nos. 6,619,041 and 5,066,325.

All patents and publications referred to herein are hereby incorporated by reference in their entireties.

Although the present invention and its advantages have been described in detail, it should be understood that various changes, substitutions, and alterations could be made without departing from the spirit and scope of the invention as defined by the following claims.

What is claimed is:

1. A method of processing uncalcined coke comprising:
   (a) introducing at least one stream comprising a refinery offgas into a combustion chamber;
   (b) introducing at least one stream comprising uncalcined coke into the combustion chamber wherein the uncalcined coke has a particle size distribution in which at least 50% of the particles pass through a 200 mesh screen; and
   (c) combusting at least a portion of the stream comprising refinery offgas and at least a portion of the stream comprising uncalcined coke within the combustion chamber.

2. The method of claim 1 wherein the refinery offgas is a rotary kiln calciner offgas.

3. The method of claim 2 wherein the at least one rotary kiln calciner offgas and the at least one stream comprising uncalcined coke are simultaneously introduced into the combustion chamber.

4. The method of claim 3 wherein the rotary kiln offgas is mixed with oxygen to form a mixture of rotary kiln offgas and oxygen prior to introduction into the combustion chamber.

5. The method of claim 4 wherein the mixture of the rotary kiln offgas and oxygen is introduced into the combustion chamber simultaneously with the at least one stream comprising uncalcined coke and at least of a portion of each of the mixture and the at least one stream comprising uncalcined coke stream are simultaneously combusted.

6. The method of claim 5 wherein the at least one stream comprising uncalcined coke is introduced into the combustion chamber through at least one solid burner.

7. The method of claim 1 wherein the at least one stream comprising uncalcined coke is comprised of a plurality of streams comprising uncalcined coke that are simultaneously introduced into the combustion chamber through a plurality of solid burners.

8. The method of claim 7 wherein at least one stream comprising oxygen is introduced into the combustion chamber.

9. The method of claim 7 wherein oxygen is introduced into the combustion chamber in amounts sufficient to produce combustion of the mixture and the plurality of streams comprising uncalcined coke and generate an incinerator outlet gas having a temperature from about 1090° C. to about 1375° C. and the incinerator outlet gas is used to produce electricity.

10. The method of claim 7 wherein oxygen is introduced into the combustion chamber in amounts sufficient to produce combustion of the mixture and the plurality of streams comprising uncalcined coke and generate an incinerator outlet gas having a temperature from about 1090° C. to about 1375° C. and the incinerator outlet gas is used to produce steam.

11. A process for the production of electricity comprising the steps of:
    (a) introducing at least one stream comprising a refinery offgas into a combustion chamber;
    (b) introducing at least one stream comprising uncalcined coke into the combustion chamber;
    (c) combusting at least a portion of the least one stream comprising a refinery offgas and at least a portion of the at least one stream comprising uncalcined coke in the combustion chamber to produce an incinerator outlet gas having a temperature of about 1090° C. to about 1375° C.; and
    (d) directing the incinerator outlet gas to electrical production equipment.

12. The process of claim 11 wherein the refinery offgas is a rotary kiln calciner offgas.

13. The process of claim 12 wherein the rotary kiln offgas is mixed with oxygen to form a mixture of rotary kiln offgas and oxygen prior to introduction into the combustion chamber.

14. The process of claim 13 wherein the mixture of the rotary kiln offgas and oxygen is introduced into the combustion chamber simultaneously with the at least one stream comprising uncalcined coke and at least a portion of each of the mixture and the at least one stream comprising uncalcined coke stream are simultaneously combusted.

15. The process of claim 14 wherein the at least one steam comprising uncalcined coke is introduced into the combustion chamber through at least one solid burner.

16. The process of claim 15 wherein the at least one stream comprising uncalcined coke is comprised of particles of uncalcined coke having a particle size distribution in which at least 50% of the particles will pass through a 200 mesh screen.

17. The process of claim 16 wherein the at least one stream comprising uncalcined coke is comprised of a plurality of streams comprising uncalcined coke that are simultaneously introduced into the combustion chamber through a plurality of solid burners.

18. The process of claim 17 comprising the step of directing the incinerator outlet gas to heat transfer equipment to produce steam.

19. A process according to claim 18, wherein steam and electricity are generated in a combined gas and steam turbine cycle.

* * * * *

UNITED STATES PATENT AND TRADEMARK OFFICE
CERTIFICATE OF CORRECTION

PATENT NO. : 7,347,052 B2
APPLICATION NO. : 10/755629
DATED : March 25, 2008
INVENTOR(S) : Todd W. Dixon et al.

It is certified that error appears in the above-identified patent and that said Letters Patent is hereby corrected as shown below:

Column 7, line 66, please delete "form" and insert --from--

Column 8, line 29, please delete ""x"" and insert --"X"--

Column 8, line 39, please delete "0.27x" and insert --0.27X--

Column 8, line 39, please delete "0.30x" and insert --0.30X--

Column 8, line 41, please delete "0.13x" and insert --0.13X--

Column 8, line 41, please delete "0.19x" and insert --0.19X--

Column 8, line 42, please delete "0.21x" and insert --0.21X--

Column 8, line 43, please delete "0.25x" and insert --0.25X--

Column 8, line 45, please delete "0.67x" and insert --0.67X--

Column 8, line 45, please delete "about x" and insert --about X--

Column 8, line 48, please delete "0.21x" and insert --0.21X--

Column 8, line 48, please delete "0.25x" and insert --0.25X--

Column 8, line 49, please delete "0.13x" and insert --0.13X--

Column 8, line 50, please delete "0.19x" and insert --0.19X--

Column 8, line 52, please delete "0.57x" and insert --0.57X--

Column 8, line 53, please delete "0.77x" and insert --0.77X--

Column 8, line 55, please delete "form abut 0.38x" and insert --from about 0.38X--

Column 8, line 55, please delete "0.40x" and insert --0.40X--

Column 8, line 57, please delete "0.38x" and insert --0.38X--

Column 8, line 57, please delete "0.40x" and insert --0.40X--

UNITED STATES PATENT AND TRADEMARK OFFICE
CERTIFICATE OF CORRECTION

| | | |
|---|---|---|
| PATENT NO. | : 7,347,052 B2 | |
| APPLICATION NO. | : 10/755629 | |
| DATED | : March 25, 2008 | |
| INVENTOR(S) | : Todd W. Dixon et al. | |

It is certified that error appears in the above-identified patent and that said Letters Patent is hereby corrected as shown below:

Column 8, line 60, please delete "form" and insert --from--

Column 8, line 61, please delete "0.2x" and insert --0.2X--

Column 8, line 62, please delete "0.3x" and insert --0.3X--

Column 9, line 17, please delete "with"

Signed and Sealed this

Twenty-fifth Day of November, 2008

JON W. DUDAS
*Director of the United States Patent and Trademark Office*